J. E. DUNN.
ELECTRIC BATTERY.
APPLICATION FILED NOV. 29, 1916.
1,233,204.
Patented July 10, 1917.
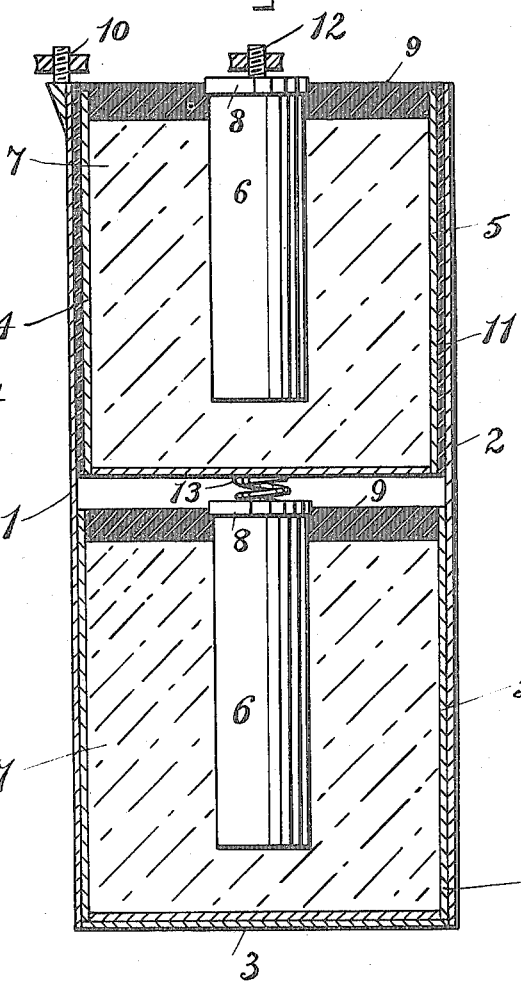
Inventor
JAY E. DUNN.
By Attorney
William F. Nickel

UNITED STATES PATENT OFFICE.

JAY E. DUNN, OF BROOKLYN, NEW YORK, ASSIGNOR TO NCVO MANUFACTURING COMPANY, OF NEW YORK, N. Y., A CORPORATION OF NEW YORK.

ELECTRIC BATTERY.

1,233,204.  Specification of Letters Patent.  Patented July 10, 1917.

Application filed November 29, 1916. Serial No. 134,077.

*To all whom it may concern:*

Be it known that I, JAY E. DUNN, a citizen of the United States, residing at Brooklyn, in the county of Kings and State of New York, have invented certain new and useful Improvements in Electric Batteries, of which the following is a specification.

My invention relates to an improvement in primary electric batteries; particularly batteries of the type comprising several cells disposed in a suitable container and connected in the required manner.

It is the principal object of my invention to provide a battery of the kind just mentioned having a container so constructed as to be strong, durable and impervious to moisture, easy and inexpensive to manufacture, and capable of receiving two or more cells and permitting them to be electrically connected in the simplest possible way to achieve the desired result.

Other objects and advantages of my invention will appear from the following description, taken with the accompanying drawings; and the characteristics of my invention will be pointed out in the subjoined claims. The embodiment of my invention herein shown, however, is to be understood as illustrative only; and I reserve the right to vary the structural details thereof in accordance with the scope and spirit of my invention as the same is defined by the terms in which the claims are expressed.

On the drawings:

Figure 1 represents a longitudinal section of an electric battery made according to the principle of my invention; and Figs. 2 and 3 show details.

The same numerals of reference identify the same parts throughout.

My improved battery includes a container 1, which is preferably of some good electrically conductive material, such as tin; and which consists of a body 2 and bottom 3. The body is made by rolling a plate into the form of a cylinder and soldering the edges to each other; and then soldering one end of the body to the bottom; in order to join these two parts together. When completed, the outer surface of the container may be given a coating of varnish or enamel; but the inside surface is left uncovered so that it may come into direct contact with the casing 4 of one of the cells 5 which are disposed in the container 1.

Each of these cells 5 comprises a casing that is a counterpart of the container 1; that is, it is made of a plate of conductive metal, such as zinc, rolled into a cylinder and soldered at its edges, to provide a body; and a bottom of the same metal; the body and bottom of the casing being joined to each other by soldering in the same way as the body 2 and bottom 3. This casing 4 serves as one pole or electrode of the cell; and holds the chemical ingredients by the action of which the electric current is generated. The other electrode is afforded by a rod of carbon 6 which is located in the center of each casing and extends down into the ingredients; which are diagrammatically shown and indicated by the numeral 7. These ingredients may be any chemical substances that will serve my purpose; and the nature thereof need not be detailed here, for the reason that the materials employed to act upon the electrodes of the battery do not constitute a part of my invention. The carbon rods 6 project slightly above the tops of the casing 4; and each rod may have a metallic cap 8; and the top of each cell may receive a layer of suitable insulating compound 9; such as sealing wax, which surrounds the carbon rod and serves as a cover to seal the cell and protect the contents of the same.

The lowermost cell 5 only has the outer surface of its casing 4 in electrical contact with the inside surface of the container 1; and the container has secured thereto near its upper edge a binding post 10; which is in fact one of the terminals of the battery. The cell above the lowermost cell is wrapped with a suitable insulating substance, such as paraffin paper, oiled silk, etc., indicated by the numeral 11; whereby the outside surface of the casing 4 of the cell in question may be kept out of contact with the container 1. To the cap 8 of the carbon rod 6 of this cell is affixed another binding post 12, constituting the other battery terminal; and the lowermost cell is placed in electrical connection with the cell above it by soldering to the cap 8 on the carbon rod 6 of the lowermost cell a resilient member, such as a spring 13; which yieldably makes contact with the bottom of the casing 4 of the cell above it. The rod 6 of the lowermost cell of course projects up far enough to keep the casings 4 of the two cells from coming together and touching; and the spring 13 will insure the maintenance of a good contact between the zinc casing of the upper cell and the carbon electrode of the lower. If the two casings should be placed relatively close together, the spring 13 will yield and the connection between the two cells be preserved; while if the two cells be relatively far apart, this spring will expand with the same result.

The two cells 5 will therefore be in series, and when the posts 10 and 12 are joined to an outside circuit, current will of course flow out of the cells 5. If more than two cells are employed, they will be disposed in the container in the same way; with only the casing of the lowermost in contact with the container, and the casings of all the rest will be wrapped with paraffin paper, oiled silk, etc., to prevent contact with the container. The cap 8 on the carbon electrode 6 of each cell but the uppermost will have a spring secured thereto for the purpose of making loose and yieldable contact with the casing of the cell next above it, to establish and preserve the series arrangement.

With a battery constructed as set forth above, a very practical construction is obtained, and at a comparatively low cost. The container and the cells can be very easily and quickly made and assembled; and when the battery is finished, it is both waterproof and strong enough not to be at all liable to suffer damage under ordinary conditions of use. It is constituted of relatively few parts; and the design is such that the connections between the lowermost cell and the container and the remaining cells can be established by the simple operation of putting the cells into the container; and therefore in the easiest way that can be devised. Hence the battery cannot get out of order; and will continue to give satisfactory service until the ingredients are exhausted by the natural chemical reactions which they undergo through their contact with the carbon and zinc electrodes of the cells 5.

In the lower cell 5, the insulation 9 engages the cell only, and not the container, to seal the cell; but the insulation in the top of the upper cell seals not only this cell, but the container also. For this purpose the insulation 9 of the upper cell 5 extends over the top rim thereof and over the insulating layers 11 between this cell and the container, to the body 2 of the container 1; closing the latter and making it both leakproof and impervious to moisture from without; and at the same time holding the cells in the container.

The spring 13, which is a spiral spring, may be replaced by a U-shaped spring, soldered at one end to the cap 8 of the rod 6 of the lower cell 5, as indicated at 14, in Fig. 2. The free end of this spring will loosely and yieldably engage the zinc bottom of the upper cell in the same way as the end of the coiled spring 13. I may also attach a threaded stem 15 to the cap 8 of the rod 6 of the lower cell 5 and solder a metal block 16 having a threaded bore to the zinc bottom of the upper cell, as shown in Fig. 3. When the upper cell is put into the container, it is turned to screw the block on the stem 15.

In practice, the lower cell is slightly larger than the upper. The lower cell must fit the container tightly and may be pressed in; while the upper is made small enough to give room for the insulation 11.

If desired, the container 1, when the battery is finished, may be inclosed in a paper cover or carton.

Of course, the body 2, after being rolled, may have its edges clenched together, instead of soldered; and may be clenched to the bottom 3; and the cells 5 may be made in the same manner.

Having described my invention, what I believe to be new, and desire to secure and protect by Letters Patent of the United States, is as follows:

1. A battery comprising a container of electrically conductive material, a plurality of cells in said container, one of said cells having a casing of conductive material in electrical contact with said container, and insulation for sealing the container, one of said cells having a terminal projecting through said insulation.

2. A battery comprising a container of electrically conductive material, a plurality of cells in said container, said cells each having a casing of electrically conductive material, one of said cells having its casing in electrical contact with the container, and the remainder of said cells having their casings insulated from the container, and insulation for sealing the container, one of said cells having a terminal projecting through said insulation.

3. A battery comprising a container, including a body and a bottom of electrically conductive material, a plurality of cells arranged end to end in said container, one of said cells having a casing of electrically conductive material in electrical contact with the bottom and body of said container, and insulation for sealing the container, one of said cells having a terminal projecting through said insulation.

4. A battery comprising a container, including a body and a bottom of electrically conductive material, a plurality of cells arranged end to end in said container, said cells each having a casing of electrically conductive material, one of said cells having its casing in electrical contact with the bottom and body of the container, and the remainder of said cells having their casings insulated from the container, and insulation for sealing the container, one of said cells having a terminal projecting through said insulation.

In testimony whereof, I have signed my name to this specification this 21st day of November, 1916.

JAY E. DUNN.